April 27, 1948.  J. J. BAUMAN  2,440,628
HUMIDITY CONTROL
Filed Feb. 2, 1945  2 Sheets-Sheet 1

Inventor:
John J. Bauman
by his Attorneys
Howson & Howson

Patented Apr. 27, 1948

2,440,628

UNITED STATES PATENT OFFICE 2,440,628

HUMIDITY CONTROL

John J. Bauman, Abington, Pa., assignor by mesne assignments, to Philco Corporation, Philadelphia, Pa., a corporation of Pennsylvania Application February 2, 1945, Serial No. 575,876

4 Claims. (Cl. 236—44)

This invention relates primarily to refrigerating apparatus and more particularly to refrigerators of the type including a high humidity compartment adapted for refrigeration of food stuffs without dehydration and wherein means is provided for maintaining within reasonable limits a substantially constant relative humidity within the said compartment.

In my co-pending application S. N. 565,435, filed November 28, 1944, I have described a refrigerator of the above class, together with means responsive to relative humidity within the compartment for removing excessive moisture from the air within the latter so as to maintain the relative humidity below a predetermined maximum.

The present invention contemplates an improved device for controlling the operation of the aforesaid dehumidifying means, said device operating in accordance with relative humidity conditions within the compartment and acting to substantially improve the functional characteristics of the refrigerator with respect to humidity conditions.

A primary object of the invention, therefore, is to provide an improved device for controlling the operation of dehumidifying means associated with a refrigerated high humidity food storage compartment.

Another object of the invention is to provide a control device of the stated character which utilizes the temperature differential between dry and wet control elements both exposed within the storage chamber to regulate relative humidity within the chamber.

Still another object of the invention is to provide a differential control device of the aforesaid type which includes novel means for maintaining the wet element in moist condition.

The invention further resides in certain structural devices hereinafter described and illustrated in the attached drawings wherein.

Figure 1:
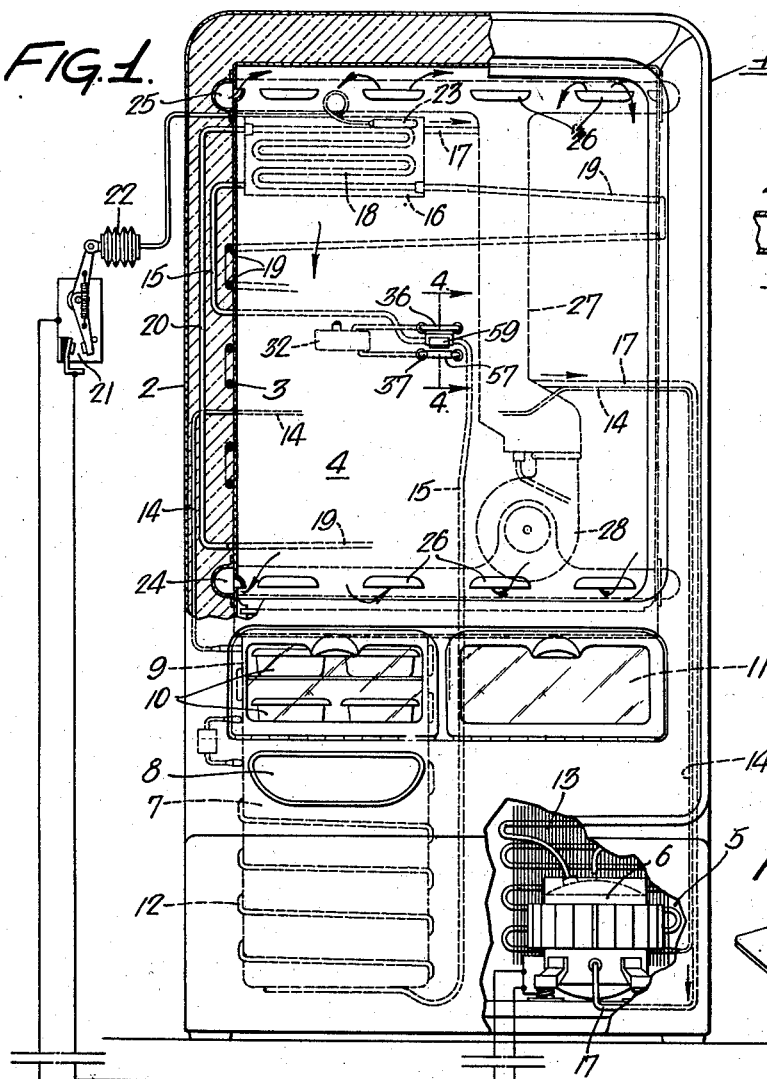
Figure 1 is an elevational and partial sectional view of a refrigerator embodying the invention.

For purposes of definition, the invention has been illustrated in the attached drawings in its application to a refrigerator of the character illustrated in my co-pending application Serial No. 565,435. This refrigerator comprises a cabinet 1 having an outer shell 2 and an inner metal shell or liner 3 which embraces a main food storage space 4. A machinery compartment 5 is located in the lower part of the cabinet and in this compartment is housed a motor compressor unit, designated by the reference numeral 6, which forms an essential part of the refrigerant circulation system by means of which the interior chambers of the cabinet are refrigerated. The cabinet further comprises a frozen food storage bin 7 having a top access opening 8 and, above the bin 7, a compartment 9 adapted to receive trays 10 in which water is frozen for manufacture of ice cubes. Above the machinery compartment and insulated therefrom is a low temperature storage compartment 11.

The three compartments 7, 9, and 11 are refrigerated through the medium of an evaporator 12 which constitutes an element of the primary refrigerant system which includes the compressor 6. Thus the compressor is connected with the condenser 13 and through the condenser and by way of a capillary tube 14 with the said evaporator 12. From the evaporator 12 a pipe 15 extends to a small primary evaporator 16 which in turn is connected through a suction pipe 17 to the compressor. The small primary evaporator 16 is operatively associated with the condensing portion 18 of a secondary refrigerant circuit which includes evaporator tubing 19 associated with the metallic inner liner 3 of the storage space 4, this secondary circuit being completed by a tube 20 which returns to the condenser 18 as illustrated.

The operation of the motor compressor 6 is controlled by a switch device 21 in the motor circuit. This switch is responsive to temperatures in the evaporator 16, and to this end the switch element is associated with a bellows-type actuator 22 which is operatively connected to a bulb 23 positioned in heat exchange relation with the evaporator 16. This control is of a character to afford a temperature differential of several degrees between the opening and closing of the said switch 21.

Figure 2:
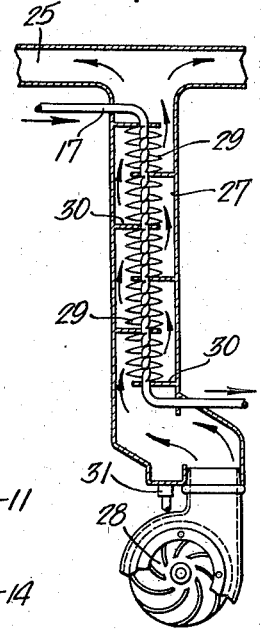
Figure 2 is a fragmentary sectional view illustrating certain details of the refrigerator construction.

Means is provided for circulation of the air in the chamber 4 and for passage of this air in course of circulation in intimate heat exchange relation with a portion of the refrigerant flow tubing 17. To this end manifold chambers 24 and 25 are provided in the insulated wall of the compartment 4 and at bottom and top respectively of the latter. Louvre openings 26—26 in the liner 3 provide communication between the manifold chambers 24 and 25 and the interior of the chamber 4. At the back of the liner 3 a passage 27 is provided between the manifolds 24 and 25, this passage communicating at its lower end with the discharge side of a rotary fan or blower 28, the intake of which is connected to the manifold 24. Operation of the blower 28 has the effect of drawing air from the chamber 4 into the manifold 24 and of forcing this air upwardly through the passage 27 to the manifold 25 and through the upper louvres 26 into the upper part of the chamber 4. As illustrated in Fig. 2, the suction duct 17 extends in part longitudinally through the interior of the passage 27 and within said passage is provided with projecting metallic fins 29. Baffles 30 within the passage 27 direct the air flowing therethrough in a tortuous path in intimate thermal exchange relation with the surface of the duct 17 and the thermal transfer fins 29. Means hereinafter described is provided for controlling the operation of the blower 28 in accordance with humidity conditions within the chamber 4.

The aforedescribed apparatus operates as follows: Existence of undesirably high humidity within the compartment 4 initiates operation of the blower 28 thereby causing air to be withdrawn from the chamber 4 through the manifold 24, said air being passed upwardly through the passage 27 to the manifold 25 through which it is reinjected into the chamber 4. In its flow over the surfaces of the refrigerant duct 17 and fins 29, the air loses moisture which is deposited on the said surfaces from whence the moisture eventually passes downwardly by gravity to a discharge vent 31 in the lower part of the passage 27. The operation of the blower continues until the relative humidity of the air in the compartment 4 has been reduced to a desirable value at which time the operation of the blower is automatically discontinued.

If the motor compressor 6 is functioning during operation of the blower 28, it will be evident that the suction line 17 within the passage 27 will be at a relatively low temperature, and the heat transferred from the air to the refrigerant will be absorbed in the primary refrigerating circuit.

If on the other hand the relative humidity within the compartment 4 should become excessive during an off period of the motor compressor cycle, the line 17 will be at a relatively high defrosting temperature and its capacity to absorb further heat will be relatively small. Under such conditions only small amounts of moisture could be condensed in the dehumidifying zone. Should this reduced heat exchange capacity be insufficient to restore the desired relative humidity condition within the food compartment, operation of the compressor will be re-established automatically, as follows:

As soon as the temperature of the suction line and the adjacent surfaces of the passage 27 rise substantially, heat will flow back along the suction line to the primary evaporator 16. As pointed out above, the control bulb 23 is positioned so that it may respond to this back flow of heat thereby to re-establish operation of the compressor 6 by closing the control switch 21. This will reduce the temperature of the suction line 17 to the required extent.

This refrigerating apparatus and its mode of operation have been fully described in my aforesaid co-pending application Serial No. 565,435 and form no part of the present invention except in so far as the elements of the apparatus relate to the control means now to be described.

Figure 3:
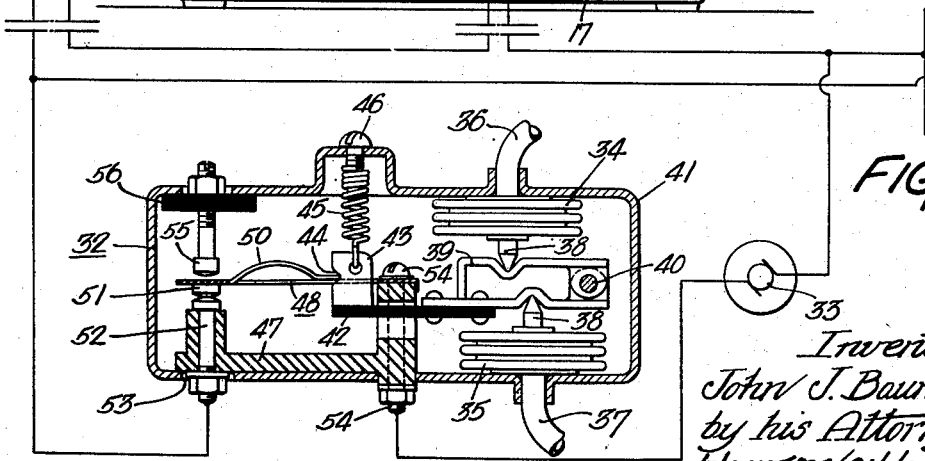
Figure 3 is an enlarged sectional view showing the details of the control apparatus, together with the associated electrical wiring diagram.

In accordance with the present invention, the electrical control circuit of the actuating motor for the blower 28 is provided with a control switch of the character illustrated in Fig. 3 and designated generally by the reference numeral 32. In this figure, the actuating motor for the blower 28 is indicated at 33. In accordance with the invention, the switch 32 is actuated in response to a changing temperature differential between two thermo-sensitive pressure devices operatively associated with the chamber 4. Each of these devices takes the form in the present instance of a bellows or like expendable and contractable element, 34 and 35 respectively, having connected thereto a closed bulb, 36 and 37. The bulbs 36 and 37 and their associated bellows contain a thermo-sensitive medium which expands and contracts in accordance with increasing and decreasing temperatures to which the bulbs 36 and 37 may be exposed. In the present instance the bulbs are exposed within the chamber 4 and the remaining portions of the devices, together with the switch 32, are contained within the insulation between the liner 3 and the outer wall 2 of the cabinet.

As shown in Fig. 3, each of the bellows 34 and 35 carries at its outer end a pin 38 or other suitable bearing element which respectively engage opposite sides of a lever 39 which is pivotally supported at 40 within the housing 41 of the switch device 32. Preferably and as illustrated, the points of engagement between the pins 38 and the lever 39 are slightly offset with respect to each other longitudinally of the lever, the bearing point for the bellows 36 being relatively remote to the pivot pin 40. The lever has an extension 42 of electrical insulating material, and on the outer end of this extension is a block 43 having in the forward side thereof a notch 44, the function of which will be hereinafter described. Connected to the block 43 is a spring 45 which tends to retain the lever in a relatively elevated position as illustrated. The tension of the spring 45 may be regulated from the exterior of the housing 41 through the medium of an adjusting screw 46.

Figure 7:
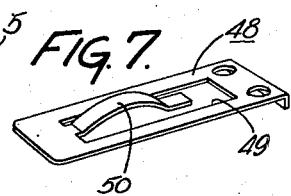
Figure 7 is a view in perspective of one of the elements of the device illustrated in Figure 3.

Secured to the housing 41 and inside the latter is an insulator element 47 which extends upwardly at one end to form a support for a flexible switch member 48, this member being more clearly illustrated in Fig. 7. As therein shown, the member has an opening 49 through which the block 43 extends and an arcuate tongue element 50, the free end of which seats within the notch 44 of the block 43, the relative dimensions being such that the tongue 50 when thus engaged with the block is held under compression. The outer end of the member 48 is provided with an electrical contact element 51 which is adapted for engagement with an opposed contact 52 which extends downwardly through a terminal extension of the insulator 47 and projects through an aperture 53 in the housing 41. The other end of the member 48 is secured to the insulator 47 through the medium of two screws 54 which also extend to the outside of the housing 41 through the said insulator 47.

As shown in Fig. 3 when the member 48 is in the relatively depressed position with the contact element 51 in engagement with the element 52, the circuit of the motor 33 is completed with the result that the blower 28 is actuated. If, however, the lever 39 moves slightly downward from the position in which it is shown in the drawing, the terminal end of the tongue 50 which occupies the notch 44 will be moved below the plane of the member 48 whereupon the tongue, which is under compression as described, will act to elevate the outer end of the member 48 with a snap action and to thereby separate the contact 51 from the contact 52. This will open the motor circuit and will interrupt the operation of the blower. It will be noted that the extent to which the resilient member 48 may flex upwardly is limited by a stop element 55 which is carried by an insulator block 56 within the housing 41 and which may be adjusted from the outside of the housing in a manner apparent from the drawing. The contact 52 similarly limits the flexing of the member 48 in the opposite direction so that the total movement of the member between the circuit-opening and closing positions is a relatively small one. This type of micromatic switch member is well known in the electrical arts and per se forms no part of the present invention.

Figure 6:
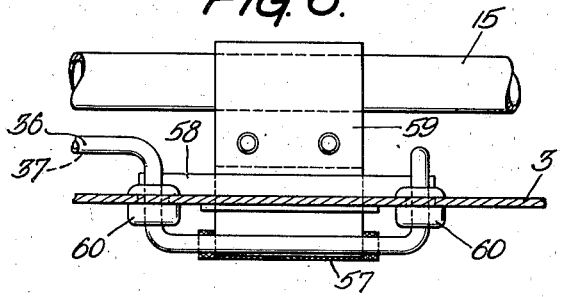
Figure 6 is a plan view of the portion of the apparatus illustrated in Figures 4 and 5.
Figure 4:
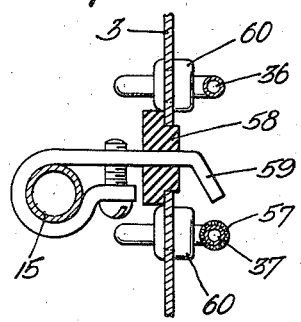
Figure 4 is a section on the line 4—4, Figure 1.
Figure 5:
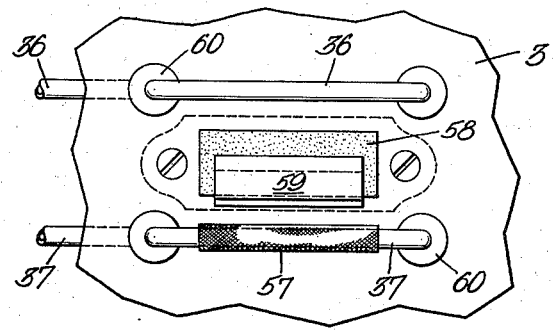
Figure 5 is an elevational view of the portion of the apparatus illustrated in Figure 4.

The position of the lever 39 is determined by the differential between the pressures exerted by the bellows 34 and 35, and these pressures are functions of the temperatures to which the bulbs 36 and 37 are exposed, within the chamber 4. These temperatures differ by reason of the fact that the bulb 37, which communicates with bellows 35, is provided with a moisture-absorbing sleeve or jacket 57 to which moisture is provided by a device illustrated in Figs. 4, 5, and 6. As therein illustrated, the inner liner 3 is provided with an opening intermediate the bulbs 36 and 37 in which is established a thermally nonconductive element 58. Extending through this element 58 is a metallic member 59 which externally of the chamber 4 is clamped to the refrigerant conduit 15 so that it is in intimate heat exchange relation with the evaporator portion of the primary refrigerating system. The metallic element 59 is thus maintained at a relatively low temperature as compared with the liner 3 and sufficiently low to constitute a focal point of condensation of moisture within the chamber 4. By reason of the down-turned form and arrangement of the terminal end of the member 59, the condensed moisture will drop from the lower edge of the member upon the sleeve 57 and will be absorbed by the latter. It is to be noted that the member 59 is insulated from the liner 3, and that rubber or other suitable grommets 60 are provided in the apertures in the liner 3 through which the bulbs 36 and 37 pass to seal said openings and to insulate the bulbs from the liner.

The condenser member 59, in conjunction with the sleeve 57, thus acts to maintain the bulb 37 wet with water. The temperature of the bulb 37, therefore, unlike the bulb 36, is in part affected by the rate of evaporation of the moisture from the sleeve 57. To the extent to which the temperature of the bulb is affected by such evaporation, the temperature will vary inversely with the variation in rate of evaporation. As the relative humidity in the chamber drops the said rate will increase and the temperature of the bulb will correspondingly fall. The pressure in the bellows 35 will then decrease and the bellows will tend to contract with the result that the lever 39 will move down (counterclockwise as viewed in Fig. 3) and carry with it the free end of the tongue 50. When this movement has progressed to the point where the end of the tongue passes below the plane of the switch member 48 the latter will snap upwardly, thereby breaking the contact between 51 and 52 and interrupting the operation of the blower as described.

The relative humidity in the chamber 4 will then tend to build up until the rate of evaporation from the sleeve 57 has fallen to the point where the increasing temperature of the bulb 37 will operate through the bellows 35 to elevate the lever 39 to an extent effecting a reactuation of the switch member 48 restoring the circuit of the blower motor. Dehumidification is then reestablished as described. By this means the relative humidity in the compartment 4 may be maintained within a predetermined limited range.

It should be understood that the control movements of the lever 39 which result from the pressure differential existing between the "wet" and "dry" bellows are a function of the variations in percent relative humidity of the air in the compartment 4. It will be evident that if the dry-bulb temperature of the said air could be maintained within sufficiently close limits, a useful control movement of the lever might be realized without the use of the dry bulb bellows.

Figure 10:
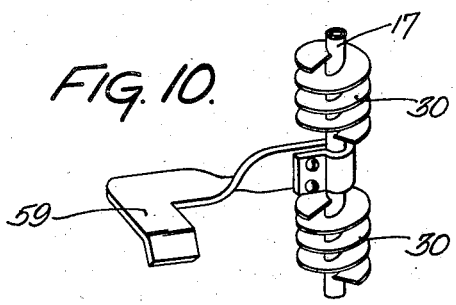
Figure 10 is a fragmentary view in perspective illustrating a further modification within the scope of the invention.

In the embodiment of the device described above the condenser element 59 is associated with the duct 15 at a point between the evaporators 12 and 16 or in a part of the primary refrigerating system which is materially colder than the liner 3 of the chamber 4 both in the "on" and "off" cycles so that the sleeve 57 is maintained substantially continuously in wet state. In Fig. 10, I have shown the element 59 in association with the suction line 17 by virtue of which arrangement, the element 59 is subjected to relatively high and relatively low temperatures, alternately, as will be understood from my aforesaid co-pending application.

Figure 8:
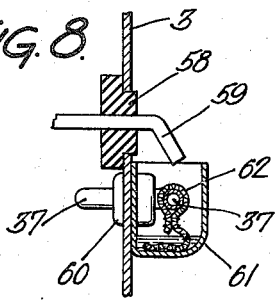
Figure 8 is a fragmentary sectional view of the same character as Figure 4 illustrating a modification within the scope of the invention.
Figure 9:
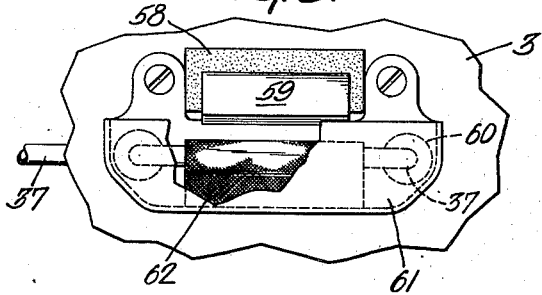
Figure 9 is a front view of the device illustrated in Figure 8.

In order to insure adequate supply of moisture to the sleeve 57 under these conditions, the device as shown in Figs. 8 and 9 may be employed. In this case a receptacle 61 is provided for retaining excess condensate, produced for example during the "on" phase of the refrigerating cycle, and a suitable wick 62 is used to carry this liquid from the receptacle to the sleeve. The device in this embodiment is independent of continuity in the condensing function of the element 59.

I claim:

1. In a device for controlling humidity in high humidity storage chambers of refrigerators of the type having a refrigerant circulating cooling system, a movable control element, a pressure means responsive to the temperature within said chamber, a second temperature responsive pressure means having an actuating element exposed within said chamber, said first-named and second means being arranged to exert forces tending respectively to displace said control element in opposite directions, and an element in thermal exchange association with said cooling system and extending into said chamber to form within the latter an area of low temperature for condensation of part of the moisture in the atmosphere of said chamber, said condensing element being positioned above the said actuating element of the second pressure means for gravity transfer of the condensate from the condensing element to the actuating element.

2. In a refrigerator of the type having a high humidity storage compartment and refrigerating means including cooling surfaces exposed within and operating at temperatures above the normal dew point temperature of air within said compartment to cool the latter, humidity control means including a pair of temperature-sensitive means exposed within the compartment and adapted to initiate a humidity regulating operation in response to a predetermined temperature differential therebetween, an element disposed within the said compartment in moisture-transfer relation with one of said temperature-sensitive means, and means for maintaining said element at a temperature below the normal dew point temperature of the air within said compartment, said element thereby constituting a moisture-collecting means for wetting the said one sensitive means so that the temperature thereof may vary as a function of the rate of evaporation of the wetting medium within said compartment.

3. In a refrigerator of the type having a high humidity storage compartment and refrigerating means including cooling surfaces exposed within and operating at temperatures above the normal dew point temperature of air within said compartment to cool the latter, humidity control means including a pair of temperature-sensitive means exposed within the compartment and adapted to initiate a humidity regulating operation in response to a predetermined temperature differential therebetween, and apparatus operatively connected with said refrigerating means for wetting one of said temperature-sensitive means so that the temperature thereof may vary as a function of the rate of evaporation of the wetting medium within said compartment, said apparatus including moisture-collecting means disposed within said compartment in moisture-transfer relation with said one temperature sensitive means and maintained by the refrigerating means at a temperature below the normal dew point temperature of the air within said compartment.

4. In a refrigerator of the type having an inner liner defining a storage compartment and an evaporator arranged in heat exchange relation with exterior surfaces of said liner, said evaporator being operative at a temperature below the normal dew-point temperature of air within said compartment and being effective to maintain interior liner wall surfaces at a temperature above the normal dew-point temperature of said air, humidity control means, a pair of temperature sensitive means exposed within said compartment and adapted to initiate a humidity controlling operation in response to a predetermined temperature differential therebetween, and apparatus for wetting one of said means so that the temperature thereof may vary as a function of the rate of evaporation of the wetting medium within said compartment, said apparatus including moisture collection means disposed within said compartment in moisture-transfer relation with said one temperature sensitive means and having a portion so arranged in high heat exchange relation with said evaporator as to insure that said moisture collection means will be maintained at a temperature below the normal dew-point temperature of the air within said compartment.

JOHN J. BAUMAN.

REFERENCES CITED

The following references are of record in the file of this patent:

UNITED STATES PATENTS

| Number | Name | Date |
| --- | --- | --- |
| T.-M. 112,883 | Fulton Co. | Oct. 3, 1916 |
| 1,962,505 | Henning | June 12, 1934 |
| 2,093,725 | Hull | Sept. 21, 1937 |
| 2,130,092 | Kettering | Sept. 13, 1938 |
| 2,192,851 | Tobey | Mar. 5, 1940 |
| 2,346,837 | Grooms | Apr. 18, 1944 |